United States Patent [19]

Lackner

[11] 3,911,477

[45] Oct. 7, 1975

[54] COLOR VIDEO TAPE RECORDER UTILIZING A COLOR SUBCARRIER OSCILLATOR AS AN ERASING SIGNAL

[75] Inventor: Robert Lackner, Vienna, Austria

[73] Assignee: U.S. Philips Corporation, New York, N.Y.

[22] Filed: Nov. 21, 1973

[21] Appl. No.: 418,078

[30] Foreign Application Priority Data

Dec. 28, 1972 Austria ............................ 11105/72

[52] U.S. Cl. ........................................ 358/4; 360/66

[51] Int. Cl.[2] ........................................ H04N 5/785

[58] Field of Search ............................ 358/4; 360/66

[56] References Cited

UNITED STATES PATENTS

| | | | |
|---|---|---|---|
| 3,493,675 | 2/1970 | Iwai et al. | 360/66 X |
| 3,621,148 | 11/1971 | Johnson | 360/66 X |
| 3,681,526 | 8/1972 | Camras | 360/66 X |
| 3,797,038 | 3/1974 | Brander | 360/66 X |
| 3,821,786 | 6/1974 | Camras | 358/4 |

*Primary Examiner*—Robert L. Griffin
*Assistant Examiner*—Mitchell Saffian
*Attorney, Agent, or Firm*—Frank R. Trifari; Simon L. Cohen

[57] ABSTRACT

The invention relates to a recording and/or playback apparatus for colour video signals in which an oscillator included in the apparatus for generating the colour subcarrier is also used as a source of erase signals for supplying an erase head, preferably a rotating erase head.

2 Claims, 1 Drawing Figure

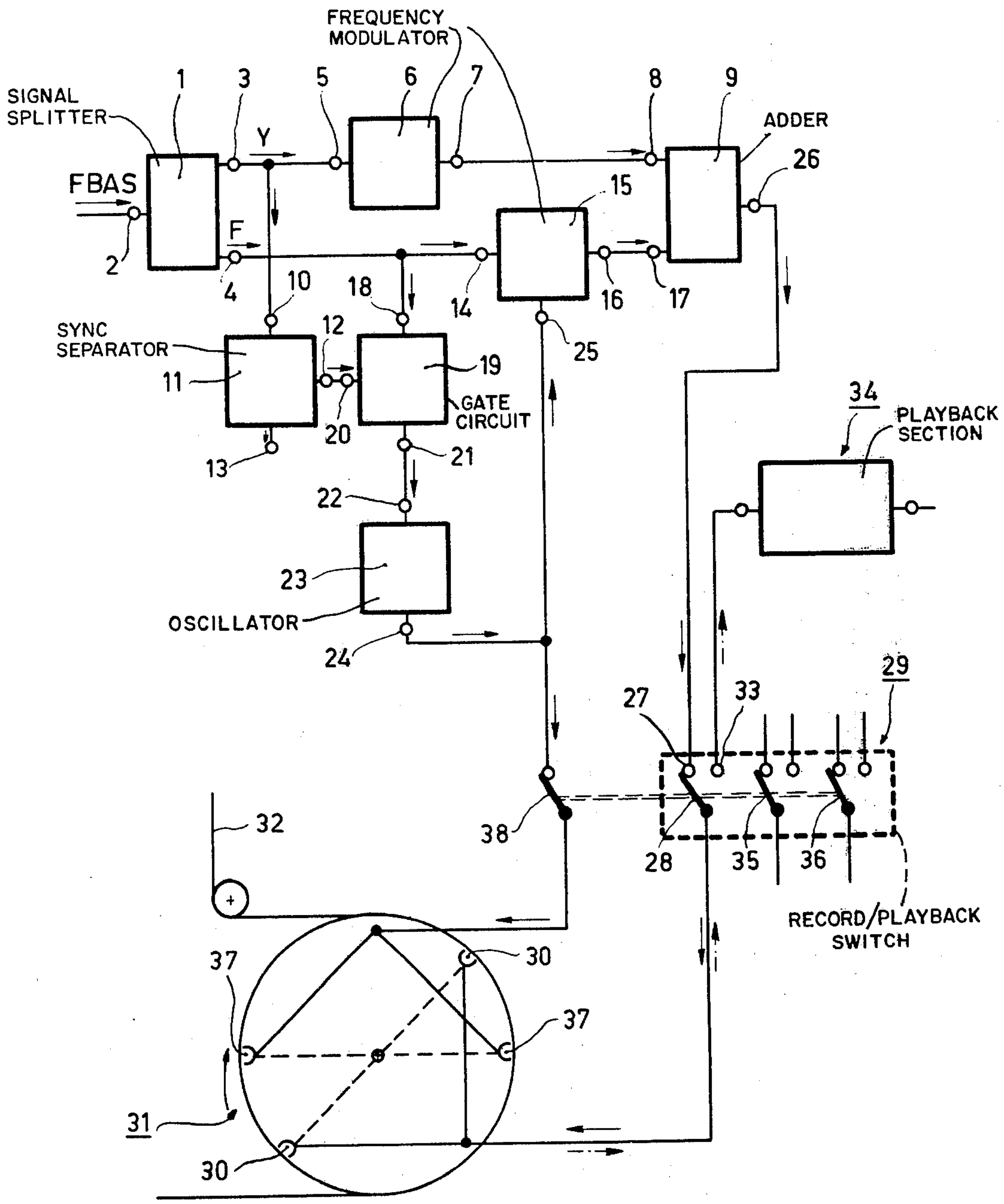
FREQUENCY MODULATOR
SIGNAL SPLITTER
ADDER
FBAS
Y
F
SYNC SEPARATOR
GATE CIRCUIT
OSCILLATOR
PLAYBACK SECTION
RECORD/PLAYBACK SWITCH
1
2
3
4
5
6
7
8
9
10
11
12
13
14
15
16
17
18
19
20
21
22
23
24
25
26
27
28
29
30
31
32
33
34
35
36
37
38

COLOR VIDEO TAPE RECORDER UTILIZING A COLOR SUBCARRIER OSCILLATOR AS AN ERASING SIGNAL

The invention relates to a recording and/or playback apparatus for video signals provided with a preferably rotating head assembly which scans the tracks on a record carrier and comprises at least one record and/or playback head and at least one erase head for trackwise erasing a recorded video signal.

According to the invention it is proposed to provided such an apparatus, which serves to record and/or play back color television signals, with an oscillator for generating a color subcarrier, which oscillator is synchronized with the color synchronizing signal of the color video signal and can be connected to the erase head in order to supply it.

In a known recording and/or playback apparatus for color video signals an oscillator synchronized with the color synchronizing signal is provided in any case for other purposes. In such an apparatus the steps according to the invention enable a separate oscillator for generating the erasing signal to be dispensed with. Moreover no new signal which may be a source of disturbance is introduced in the apparatus.

The invention and an advantageous modification thereof will now be described with reference to an embodiment shown in the accompanying drawing, the single FIGURE of which shows a section of a circuit arrangement for signal processing in a recording and/or playback apparatus.

Referring now to the FIGURE, the circuit section shown of a recording and/or playback apparatus for color video signals comprises a signal splitter 1 to the input 2 of which a color video signal FBAS can be applied and at one output 3 of which a luminance signal Y and at the other output 4 of which a chrominance signal F appear.

The output 3 of the signal splitter 1 is connected to an input 5 of a frequency modulator 6 the output 7 of which is connected to a first input 8 of an adding circuit 9 and also to an input 10 of a separating stage 11 for separating the synchronizing pulses from the luminance signal Y. The separating stage 11 has two outputs 12 and 13, and from the output 13 the synchronizing pulses of the video signal can be derived to be applied to other circuit sections of the apparatus, for example for control purposes.

The output 4 of the signal splitter 1 is connected to an input 14 of a signal stage 15 for shifting or modulating the chrominance signal F an output 16 of which is connected to a second input 17 of the adding circuit 9 and also to an input 18 of a gate circuit 19 for deriving the color synchronizing signal from the chrominance signal F, the second input 20 of this gate circuit being connected to the output 12 of the separating stage 11.

The output 21 of the gate circuit 19 is connected to an input 22 of an oscillator 23 which serves to produce a color subcarrier. The output 24 of the oscillator 23 is connected to a further input 25 of the signal stage 15 for shifting the chrominance signal F. The output 26 of the addition circuit 9 can be connected via a contact 27 of a switch 28, which forms part of a switching arrangement 29 for switching between the record mode and the playback mode, to two record and/or playback heads 30 of a rotating head assembly 31. A record carrier 32 is helically wound around the rotating head assembly 31. To a contact 33 of the switch 28 is connected a playback signal section 34 shown symbolically to which a video signal taken from the record carrier 32 can be applied via the switching arrangement 29 in a suitable position thereof. The switching arrangement 29 further comprises switches 35 and 36 by means of which further change-over operations required for switching between the record and playback modes can be performed.

The circuit section described operates as follows. A color video signal FBAS applied to the signal splitter 1 is divided into a luminance signal Y and a chrominance signal F. The luminance signal Y is modulated in frequency in the frequency modulator 6, and the chrominance signal F is shifted to a predetermined frequency band in the signal stage 15, which band lies below the frequency range of the frequency-modulated carrier of the luminance signal Y. The resulting modulated and shifted signals are combined in the addition circuit 9 and then applied to the record and/or playback heads 30 of the rotating head assembly 31 to be recorded in tracks on the record carrier 32.

Furthermore the synchronizing pulses for the video signal are obtained by means of the separating stage 11 from the luminance signal Y derived from the signal splitter 1. The color synchronizing signal is separated from the chrominance signal F by the gate circuit 19 which is controlled by the separated synchronizing pulses. The resulting color synchronizing signal is applied to the oscillator 23 for synchronizing the latter so that it delivers an oscillation at an exactly defined frequency, in this case the color subcarrier. The color subcarrier oscillator 23 supplies the color subcarrier to the signal stage 15 in which, as has been mentioned hereinbefore, the frequency of the chrominance signal F is shifted by means of the color subcarrier.

In the rotating head arrangement 31 of such an apparatus an erase head 37 for erasing a recorded video signal in the respective track is associated with each record and/or playback head 30. The erase heads 37 are staggered with respect to the associated record and/or playback heads 30 so that all the heads scan corresponding tracks on the record carrier 32. Furthermore the output 24 of the oscillator 23 for producing the color subcarrier can be connected to the erase heads 37 of the rotating head assembly 31 via a switch 38 which may be coupled, for example, to the switching arrangement 29. Thus closure of the switch 38 causes the oscillator 23 to be connected to the erase heads 37 so that a video signal recorded on the record carrier 32 is erased trackwise by means of the color subcarrier.

In this manner in the embodiment described an oscillator which is provided in any case in the apparatus for the purpose of generating the color subcarrier is also used to obtain the erasing signal, so that not only can a separate oscillator be dispensed with but also no new signal which may be a source of disturbance is introduced into the apparatus. Erasure is effected in a particularly accurate manner because a high-frequency signal at a defined frequency is used. The choice of the color subcarrier as the erase signal furthermore is of advantage because its frequency lies near that of the frequency-modulated carrier of the luminance signal, so that the troublesome effect of a interference produced in the frequency-modulated luminance signal by the erase signal is greatly reduced because of its proximity to the frequency of the subcarrier as compared with a situation in which the frequency of the erase signal is remote from said carrier frequency.

Obviously the steps according to the invention can also be used in an apparatus which initially includes no oscillator for generating a color subcarrier. In this case such a color subcarrier oscillator synchronized by the color synchronizing signal is to be provided.

It has also been found of advantage to include a frequency converter, not shown, between the oscillator 23 and the erase heads 37 in order to enable the color subcarrier produced by the oscillator 23 to be shifted by an integral multiple to a higher or lower frequency. This permits of simple matching to signals present in an apparatus with consequent reduction of the disturbing influence of the erase signal to a minimum.

Obviously the aforedescribed embodiment may be modified in a variety of manners within the scope of the invention. This is the case, for example, with respect to the construction of the rotating head assembly in respect of the number of rotating heads and the manner in which they cooperate with the record carrier in view of the geometric positions of the tracks on the record carrier.

What is claimed is:

1. Recording and/or playback apparatus for color video signals of the type having a rotating head assembly which scans tracks on a record carrier and comprises at least one record and/or playback head, at least one erase head for trackwise erasing a recorded video signal, the improvement wherein an oscillator synchronized with the color synchronizing signal of the color video signal is provided for generating a color subcarrier and is selectively connected to the erase head to supply the latter.

2. Apparatus as claimed in claim 1, wherein a frequency converter is included between the oscillator and the erase head.

* * * * *